United States Patent [19]

Brandl et al.

[11] 3,847,622

[45] Nov. 12, 1974

[54] POLISH

[75] Inventors: Eugene H. Brandl, Weehawken; Neil M. McHugh, Bridgewater, both of N.J.

[73] Assignee: Colgate-Palmolive Company, New York, N.Y.

[22] Filed: May 29, 1973

[21] Appl. No.: 364,368

[52] U.S. Cl................................. 106/10, 106/271
[51] Int. Cl............................................. C08h 9/08
[58] Field of Search .................................. 106/3-11

[56] References Cited
UNITED STATES PATENTS 2,849,324   8/1958   Cox...................................... 106/10
3,395,028   7/1968   Mackles................................ 106/10
2,868,657   1/1959   Sesso ................................... 106/10

Primary Examiner—Theodore Morris
Attorney, Agent, or Firm—Herbert S. Sylvester; Murray M. Grill; Norman Blumenkopf

[57] ABSTRACT

This invention involves the process of preparing a water-in-oil emulsion, where the water is added to the other ingredients in solid form or at a temperature less than 105°F. The emulsion contains a wax, a mixture of organopolysiolxanes, a solvent, an oil soluble emulsifier and water. The composition produced by the disclosed process is also related to the invention.

22 Claims, No Drawings

POLISH

This invention relates to a novel process for preparing a water in oil emulsion useful for treating hard surfaces as well as the composition produced thereby.

Presently known methods for preparing so called "wax-polishing" compositions of the water in oil type entail significant disadvantages, including for example, the requirement for melting the wax prior to adding same to heated organic solvent as well as the necessity for using hot aqueous media in the emulsion-forming step. Generally, the heated aqueous solution is added to the oil or solvent phase portion in which all oil phase ingredients e.g., mineral oil, silicone oil and the like, have been previously dissolved or dispersed. As will be recognized, excessive heating and cooling periods are invariably necessary as is the use of costly heat transfer equipment to accelerate heat dissipation, and supply. Moreover, the risk to both personnel and equipment due to difficulties associated with the handling of hot chemicals e.g., molten waxes, is self-evident.

In addition, the emulsion composition produced by such processing are often inferior and particularly from the standpoint of emulsion particle size. Thus, emulsion polish compositions having an undesirably large particle size often produce inferior luster, gloss, hardness, durability and wetting and spreading characteristics, as well as exhibiting a pronounced tendency to smear when applied to hard surfaces such as metal, wood, and finished wood, particularly the latter. This is probably due to the tendency of the emulsion particles to agglomerate when spread over the surface being treated and thus the possibility of laying down a continuous, high quality wax film is minimal.

In order to remedy the foregoing, a wide variety of techniques have been promulgated in the art which focus both on the composition and the process. However, any improvement obtained, is often of only marginal significance. Thus, the suggested use of larger quantities of wax is of little avail since the wax is easily removed by simple wiping. The use of silicones of diverse types i.e., organopolysiloxanes, although beneficial from the standpoint of luster, gloss, durability, etc., nevertheless fails to provide appreciable mitigation of the smear problem, also often referred to as "streak" or "bronze." Moreover, such compositions are quite inferior as regards protective qualities and dust resistance and require relatively vigorous modes of application in order to obtain a protective film of good quality.

In accordance with the present invention, a process for preparing hard surface treating compositions of the water in oil emulsion type is provided, the emulsion composition produced thereby having a more uniform and relatively smaller average particle size, thus being substantially devoid of the manifold disadvantages inherent in coarse-grained emulsion compositions.

In a further aspect, the present invention provides water in oil emulsion compositions useful for treating hard surfaces and wherein the advantageous properties made possible by the process used in their preparation are not only significantly enhanced but supplemented as well by virtue of controlling both the type and quantity of ingredients employed.

Thus, a primary object of the present invention is to provide a process for preparing a water in oil emulsion composition useful for treating hard surfaces wherein the foregoing and related disadvantages are eliminated or substantially reduced.

A further object of the present invention is to provide such a process wherein requirements with respect to heating, cooling and hot reagent handling are greatly minimized.

A still further object of the present invention is to provide such a process wherein the water in oil emulsion produced thereby has a uniform and comparatively small average particle size.

Another object of the present invention is to provide water in oil emulsion compositions substantially devoid of any tendency to smear or streak and which can be applied with a minimum of physical effort to a variety of hard surfaces whereby to produce a high quality continuous film.

Yet another object of the present invention is to provide a water in oil emulsion composition having excellent spreading and wetting characteristics which when applied to a hard surface can be easily buffed to produce a coating having improved dust resistance, gloss, luster, durability, hardness, lubricity and resistance to environmental effects e.g., heat, humidity, radiation, etc.

Other objects and advantages will become apparent as the description proceeds.

The foregoing and related objects are obtained in accordance with the present invention which in its broader aspects provides a process for the preparation of a stable water in oil emulsion useful for treating hard surfaces which comprises adding to, whereby to intimately contact, an organic solvent composition comprising:

A. from about 0.5 to 9 percent of organopolysiloxanes having viscosities of from about 20 to 15,000 centistokes,
B. from about 15 to 35 percent of organic solvent having an aniline point of from about −22° to 185°F and a distillation range of from about 190° to 460°F, said solvent being substantially completely miscible with said organopolysiloxane,
C. an effective amount of water in oil emulsifier, e.g., 0.25 to 3.0 percent.
D. from about 0.1 to 3 percent of wax, said wax having been added to said solvent in solid, non-molten form, each of (A), (C) and (D) being uniformly dispersed through solvent (B)

from about 50 to 84 percent of water in the liquid or frozen state, said liquid water having a temperature no higher than about 105°F. All percentages are by weight based upon total composition.

In accordance with a highly preferred embodiment, emulsion polish compositions having a particularly high resistance to smearing are provided when organopolysiloxane (A) comprising a mixture of (1) organopolysiloxane having a viscosity at 25°C of from about 50 to 550 centistokes and (2) organopolysiloxane having a viscosity at 25°C of from about 950 to 15,000 centistokes, and wherein at least 50 percent but preferably at least 70 percent of organic solvent (B) comprises an isoparaffinic hydrocarbon solvent having an initial boiling point of 190°–210°F. Thus, compliance with the aforedescribed requirements regarding the composition of components (A) and (B) insures that the resultant composition be truly uniquely devoid of any tendency to smear, yet capable of producing when applied to a hard surface a high gloss film possessed of excellent dust resistance and resistance to environmental effects with a minimum of physical effort required for buffing. Although it is preferred that these particular compositions i.e., limited as described with respect to organopolysiloxane and solvent composition be prepared by the instant process in order to obtain the many advantageous effects inherent in a water in oil emulsion having a uniform and comparatively small average particle, it has nevertheless been determined that substantial realization of the aforedescribed improvements and particularly with regard to smear resistance can be obtained though conventional and well known processes be employed for emulsion preparation. Apparently, and as investigation indicates, selection of silicone and solvent ingredients in accordance with the present invention enables truly surprising improvement in a number of properties apart from limitations associated with the process.

In carrying out the process, it is usually desirable to prepare the solvent composition by adding the oil phase ingredients to the solvent and heating the solvent to a temperature of from 160° to 185°F. It is preferred that at least the waxes and emulsifying agent be added to the solvent composition before heating.

In any event, the wax is added in solid non-molten form and thus there is no necessity or, for that matter desirability, for pre-melting the wax as is the case with much of the processing known in the art. The temperature of the oil phase is maintained within the limits given until all ingredients are dissolved or melted i.e., uniform dispersion thereof is obtained. At this point, the heat source is removed.

The aqueous media which may be simply water, or water containing other water soluble or dispersible ingredients such as surfactant, abrasive, etc., is thereupon added to the solvent phase. The water may be either liquid or solid i.e., ice. The latter is preferred when it is desired that the solvent phase be present within the upper portion of the concentration range given; the use of ice enables greater cooling with less net addition of water to the composition. The temperature of the liquid water should be no higher than about 105°F.

Perfume and other oil phase ingredients, if desired, may be added to the completely cooled emulsion composition, to avoid loss through evaporation, or to improve handling characteristics of the emulsion during blending.

If desired, the oil phase portion may be cooled to room temperature and stored prior to blending with water. Subsequent addition of cold water, with agitation of the oil phase, provides a water in oil emulsion with fine degree of size dispersion. Thus, the cold aqueous media may be added either to "hot" or "cold" (i.e., room temperature) oil phase. However, in the latter case, it is essential that rapid agitation to achieve high shear be applied to the oil or solvent phase portion.

It is generally advisable to maintain agitation of the oil phase throughout the addition of all ingredients i.e., when preparing the oil phase as well as throughout the addition of water. It is necessary that through and intimate contacting of all ingredients result from introduction of sufficient kinetic and shear energy whereby to promote uniform and homogeneous dispersion thereof. If desired, the emulsion composition may be further size reduced using conventional triturating means such as a homogenizer.

The process may be carried out using standard equipment such as a stainless steel jacketed heating vessel equipped with a high shear stirrer blade as is well known in the art.

The water in oil emulsion composition thus obtained has an average particle size within the range of 2 to 5 microns as compared to prior art water in oil emulsion polishing compositions which typically have an average particle size within the range of 10 to 50 microns. The latter "coarse-grained" emulsions are markedly inferior and particularly with respect to smearing tendency.

The water in oil emulsions hereinbefore described as comprising a particularly valuable aspect of the present invention have the following composition.

A. from about 0.5 to 9 percent of organopolysiloxane blend wherein of (1) organopolysiloxane having a viscosity at 25°C of from about 50 to 550 centistokes and (2) organopolysiloxanes having a viscosity at 25°C of from about 950 to 15,000 centistokes, B. from about 15 to 35 percent of organic solvent having an aniline point of from about −22° to 185°F and a distillation range of from about 190°F, said solvent being substantially completely miscible with said organopolysiloxane, and wherein at least about 50 percent and preferably at least 70 percent of said solvent comprises isoparaffinic hydrocarbon solvent having an initial boiling point of 190°–210°F, C. an effective amount, e.g., about 0.25 to 3 percent of water in oil emulsifier, D. from about 0.1 to 3 percent of wax, E. the balance water, and other formula ingredients e.g., fragrance preservative etc., all percentages being by weight based on total composition.

The organopolysiloxanes or "silicones" utilizable herein are known materials and have long been recognized as valuable adjuvants in hard surface-treating compositions. These materials which are normally liquids, facilitate application of the composition to a surface whereby to obtain a lustrous film by simple buffing. Specific examples include, without necessary limitation, dimethyl polysiloxane, diethyl polysiloxane, diphenyl polysiloxane, mixed alkyl polysiloxanes such as methyl-ethyl polysiloxane, block copolymers of organopolysiloxane with, for example, oxyalkylene and the like. Suitable organopolysiloxanes have a viscosity at 25°C of from about 20 to 15,000 centistokes. Silicones having a viscosity lower than 20 centistokes are usually too volatile and thus durable films are difficult to obtain. Silicones having a viscosity substantially in excess of 15,000 centistokes provide films which are difficult to buff. Certain silicones e.g., dimethyl polysiloxane are criticized because of their tendency in some instances to agglomerate when spread on a surface and the fact that they are removable only with difficulty from a wood surface being prepared for refinishing, leading to spotting and pitting in a subsequently applied lacquer layer. However, such disadvantages are substantially ameliorated by the present invention, due in large part to the character of the composition obtained via the described "cold emulsification."

The compositions of the present invention require the use of a specific blend or mixture of silicones viz, (1) an organopolysiloxane having a viscosity at 250°C of from about 50 to 550 centistokes and (2) an organopolysiloxane having a viscosity at 25°C of from about 950 to 15,000 centistokes. The relative quantities of (1) and (2) in the mixture may vary but for optimum results, the weight ratio of (1) to (2) should range from about 2:1 to 1:3. Suitable silicones include, for example a blend of the dimethyl polysiloxanes available under the Tradename designation G. E. Silicone SF-96 in the aforementioned desired viscosity ranges.

The importance of using silicones having the foregoing viscosity characterizations can be explained as follows. It might normally be expected that similar results would obtain should the aforedescribed blend of silicones be replaced with an equivalent amount of a silicone having a viscosity approximating the average value of the silicone blend. However, such is not the case as experimental investigation indicates substantial mitigation of the smear problem and concurrent enhancement of gloss in particular to obtain only with the use of the specific silicone blend described. The silicone blend must be present in amounts ranging from about 0.5 to 9 percent by weight of total composition. Thus, the silicone blend may constitute the total amount of silicone present in the composition. Up to 9 percent of silicone is tolerated and thus other silicone of the type more fully described hereinbefore may be included with the silicone blend. Thus, trimethyl polysiloxanes may be included, to enhance resistance of the composition to dust collection and environmental effects while blends of amine functional silicones may be included and particularly when the emulsion product is designed for treating metal surfaces, e.g., automobiles, in order to promote resistance to detergents.

The organic solvents suitable for use in preparing the oil phase portion may be selected from a wide variety of materials. In general, suitable solvents have an aniline point of from about −22° to 185°F, with a range of 50° to 185°F being preferred, and a distillation range of from about 190° to 460°F. Aniline points and distillation ranges are determined in accordance with the procedure prescribed by the American Society for Testing Materials. Representative solvents include, without necessary limitation, hydrocarbons, and particularly isoparaffinic hydrocarbons having an initial boiling point of 190° to 210°F, e.g., naphtha, "Stoddard" solvent, chloro-substituted hydrocarbons such as carbon tetrachloride, ethylene dichloride, perchloroethylene and trichloroethylene, hydrocarbon ethers such as ethyl, hexyl or methyl ethers. The "distillation range" criterion described previously is particularly applicable to petroleum distillate solvents. Thus, below the distillation range given, it is found that vapor pressure is excessively high and loss of solvent through volatilization during application of the emulsion composition to a surface seriously impairs emulsion covering and spreading capacity. If the distillation range is too high, drying of the applied emulsion is retarded to the extent that excessive buffing is required to achieve the desired uniform film.

Other suitable ingredients for the oil phase particularly useful for wood polishing compositions include oils of animal, vegetable or mineral origin and may be employed in amounts ranging from about 0.3 to 3.0 percent based on total composition. Examples include without necessary limitation, white mineral oil, castor oil, linseed oil, safflower oil, spindle oil, sperm oil etc. White light mineral oil is particularly preferred serving as a particularly effective solvent or dispersant for the wax component(s).

Solvent selection, like silicone selection, assumes critical importance, however, when preparing the unique compositions herein described. Thus it is found that synergistic enhancement of the smear resistance property in particular obtains when at least about 50 percent of the total solvent present comprises an isoparaffinic hydrocarbon solvent having an initial boiling point of 190°–210°F. Generally, such solvent contains from six to eight carbon atoms and may be employed singly or in admixture. Particularly effective solvents include, for example, a hydrocarbon mixture of isoparaffinic hydrocarbons consisting principally of $C_8$ isomers such as Isopar C (flash point of less than 40°F) available commercially from the Exxon Corporation.

The initial boiling point criteria is a primary importance. Thus, it is found that the equivalent use of closely related solvents such as Isopar E (Exxon Corporation), an isoparaffinic hydrocarbon consisting principally of $C_8$ isomers and having an initial boiling point of 235°–245°F fails to provide the truly marked improvement in e.g., smear resistance, obtainable with solvents typified by Isopar C. Other solvents of the type described may be used; however, in such cases it is essential that the isoparaffinic hydrocarbon solvent having an initial boiling point of 190°–210°F constitute at least 50 percent of the total solvent present.

For effective results, the total solvent should comprise from about 15 to 35 percent by weight of total emulsion composition in order to achieve an effective balance as between the properties imparted by the solvent and water phases respectively. Thus, excess solvent tends to render the emulsion product overly nonpolar thereby diminishing the effectiveness e.g., ability to remove water soluble type stains, of the water phase. Similar results obtain if the aqueous portion of the composition is present in undue excess i.e., spotting, smearing, etc., may result in the film applied to a surface in use and the ability to remove solvent-soluble stains is diminished.

The water in oil emulsifiers prescribed for use herein may be selected from a wide variety of materials well known in the art. Examples include, without limitation, sorbitan sesquioleate, such as that available commercially under the Tradename designation Arlacel C (ICI America), tall oil alkanolamides, such as that available commercially as Monamid 908 (Mona Ind.), polyglycerolleate, reaction product of morpholine-2-amino-2-methyl-1-propanol or methoxypropylamine and a fatty acid such as oleic, stearic or montanic acid. Effective amounts of emulsifier are used, i.e., amounts sufficient to adequately disperse the water phase in the oil or solvent phase as well as to provide the requisite emulsion stability on storage. In general, these amounts will range from about 0.5 to 3 percent by weight of total composition. Another of the many advantages characterizing the present invention resides in the fact that the quantity of emulsifier used may be considerably higher than is customary without detrimental effects. Thus, it is often found that the presence of emulsifiers tends to reduce gloss and promote smear and thus their use was limited. In fact, the total elimination of emulsifier is considered desirable in much of the prior art. However, the present invention removes the limitations on emulsifier use and thus significant quantities thereof may be used without attendant deleterious effects upon emulsion properties and particularly smear resistance.

The wax materials for use herein which may be of animal, vegetable or mineral origin, are also known in the art and may be selected from a wide variety of substances. The wax in its dispersed form, like the silicone, facilitates application of the emulsion to a surface to obtain a uniform film having good gloss and water resistance. Additionally, the wax tends to reduce water spotting and increase the depth of gloss. Examples, include, without limitation, paraffin wax, e.g., microcrystalline and oxidized paraffins, montan wax, ozokerite, vegetable wax e.g., carnauba wax, candellila, ouricury, palm wax and the like, animal wax such as beeswax, whale wax and the like, synthetic wax. The preferred waxes in general have a melting point of from about 120° to 230°F and are usually at least partly soluble in aliphatic hydrocarbon solvents and insoluble in lower molecular weight alcohols. Other desirable characteristics include good film forming capacity and water resistance. Particularly preferred for use herein are the montan waxes and carnauba wax. The montan wax is preferably of the oxidized type having an acid value of from about 90 to 160 and preferably 100 to 130. The oxidized montan wax may further contain ester groups obtained by esterifying at least part of the acid groups of the wax with, for example, a polyhydric alcohol or $C_{16}$ to $C_{30}$ monohydric alcohol. Suitable montan ester waxes are those commercially available under the Tradename designations Hoechst wax E, F and OP (American Hoechst Co.). The melting point ranges for these materials are respectively 169° to 178°F, 162° to 171°F and 212° to 221°F; the acid values are respectively 15 to 20, 6 to 10 and 10 to 15; the saponification values are respectively 140 to 160, 95 to 105 and 100 to 115.

The amount of wax used ranges from about 0.1 to 3 percent by weight of total composition. Wax quantities below the prescribed minimum are usually insufficient to provide the desired gloss leading to a deposited layer which is non-uniform in gloss and bearing high and low gloss streaks. If the maximum amount prescribed is exceeded, the buffing of the applied film becomes difficult. The wax quantities prescribed for use herein are significantly lower than those customarily employed in much of the prior art. In general it is considered that relatively high quantities of wax are necessary to minimize smearing as well as other surface impairing visual effects. Again, however, the present invention makes possible the effective use of relatively lower quantities of wax in the virtual absence of the smear and streak phenomena characterizing known compositions. The preferred montan ester wax and carnauba wax are employed in amounts sufficient to yield a weight ratio of the former to the latter in the range of about 2:1 to 1:2.

In conducting the process of the present phase, aqueous media, either e.g., ice or liquid water, is used in amounts ranging from about 50 to 84 percent by weight of total composition. Water is essential from a number of standpoints. Thus, many of the stains encountered in treating lacquered wood surfaces are hydrophilic in nature and thus the use of organic solvent alone would be ineffective. In this regard, the water serves as a cleaning agent. Moreover, water aids in promoting uniform dissolution or dispersion of the wax, for example, which may not be totally dissolved or dispersed by the organic solvent. Thus, the water serves additionally as an effective vehicle. It is also important to note that significantly large quantities of water may be employed in the present invention. This is somewhat unexpected in view of the well established incompatibility of wax and silicone for water. Ordinarily it would be expected that large amounts of water would tend to impair emulsion stability and cause perhaps de-emulsification. This would in turn be expected to lead ultimately to substantial smearing and other defects in the applied film producing a wholly unsatisfactory appearance. However, such is not the case in the present invention. Thus, it has been found, that not only are the manifold advantages inherent in the use of water realized to an outstanding extent but, additionally the normally expected attendant disadvantages are substantially, if not completely avoided.

The use of ice is recommended in those instances where it is desired to increase the concentration of the solvent phase in the final composition. This permits greater cooling with less net addition to water to the formula.

Other ingredients which may be employed in the composition and process of the present invention include without limitation perfumes, stabilizers, ultra violet absorbers (0.02–0.5 percent), optical brighteners (0.02–5 percent), amine functional silicones to promote detergent resistance in the applied film (0.2–2.0 percent), synthetic organic detergents e.g., anionic, nonionic, cationic, amphoteric and zwitterionic surfactants, soaps, long chain fatty amines (0.5–3 percent), antistatic agents (0.03–1 percent), wax dispersants (0.05–0.5 percent), dust repellent (0.05–0.5 percent), fluoropolymers (0.05–0.5 percent), etc.

Perfumes are added to impart a pleasant fragrance and particularly in treating wood surfaces e.g., furniture, wood panels and the like. Suitable perfumes are well known in the art and need not be described in detail here. Typically, perfumes are of complex chemistry and thus are often designated solely in terms of fragrance. Lemon oil fragrance is particularly suitable for use herein. The amount of perfume is small and may range from the effective amount necessary to impart the desired intensity of fragrance, e.g., about 0.05 percent by weight of composition up to about 1 percent.

Stabilizers may be employed in amounts ranging from a small but effective stabilizing amount e.g. about 0.02 percent up to about 0.5 percent by weight of total composition. Emulsion stabilizers are well known in the art and include without limitation, triethanolamine lauryl sulfate, polyacrylic acid, carboxymethylcellulose and the alkyl phenyl ethers of polyoxyalkylene glycols, water insoluble soaps and the like. The latter, in addition to stabilizing the composition so that it can be stored indefinitely and under diverse conditions without phase mixing i.e., de-emulsification, further acts as dispersing agents in preventing coagulation of waxes into globules of significant size during manufacture. Soaps of this type include aluminum stearate, aluminum palmitate and the like.

Suitable organic detergents include, without limitation those of the nonionic type such as polyoxyethylene esters of fatty acids, the polyoxyethylene gylcol esters of fatty acids, the polyoxyethylene sorbitan esters of fatty acids, the fatty amine condensates, the sorbitan fatty esters, the propylene glycol esters of fatty acids, the alkyl aryl polyether alcohols and the organic phosphate esters. Surface active agents of the anionic type which are similarly of particular value in these emulsions are the salts of fatty acids, the salts of alkyl aryl sulfonates, the salts of the fatty alcohol sulfates, the salts of the alkyl aryl polyether sulfonates, the salts of the sarcosinates and protein condensates.

The nonionics are particularly valuable since they significantly promote emulsification of the oil and water phases and prevent coalesense of the dispersed water phase in the final emulsion composition.

Yet additional ingredients may be included in order to achieve special effects. Thus, dye stain or pigment may be included when finishing raw wood or refinishing previously stained and lacquered surfaces. Finely divided mild abrasive may be added (included, for example, as an ingredient of the aqueous phase portion prior to blending with the solvent phase) in amounts ranging from about 0.25 to 2.0 percent by weight of the composition. Preferably, the abrasive is a kaolin type aluminum silicate abrasive. However, other mild abrasives may be used which are not harmful to the surface being treated. Thus, when preparing a paste-type car polish, the abrasive is preferably an oleophilic type which would be mixed with the solvent phase portion prior to blending with the aqueous phase portion. When preparing a liquid car polish, the abrasive is preferably introduced into the composition as a hydrophilic dry powder. Other suitable abrasives include, without limitation, finely divided silica, finely divided clay, diatomaceous earth, pumice and the like.

The water in oil emulsion compositions of the present invention may be prepared in a wide range of viscosities i.e., from a thick semi-solid viscous paste to a relatively non-viscous liquid. This depends primarily upon the amount of water present; thus, higher quantities of water tend to yield compositions having a more viscous consistency whereas water quantities in the lower portion of the range given tend to yield less to non-viscous liquids. The concentrations of the other ingredients present likewise bears on the composition consistency and particularly the concentration of wax and silicone. However, the amounts necessary to produce the desired consistency can be readily determined in a particular instance.

In accordance with a particularly valuable embodiment of the invention, the composition is provided in aerosol form. This may be readily accomplished merely by adding the emulsion composition to an aerosol container which is then capped with an aerosol valve. Thereafter, propellant is charged to achieve the desired pressure. The propellant pressure should suffice to enable substantially complete expulsion of the container ingredients through the aerosol valve as a spray. In general, it is found that from about 5 to 50 percent and preferably about 5 to 15 percent by weight of the propellant suffices at ambient temperatures. Any of a wide variety of propellants may be used including, without limitation, liquefied propellant gases such as hydrocarbons e.g., isobutane, n-butane, propane etc., halogenated hydrocarbons such as difluoroethane, difluoropropylene, hexafluoropropylene, tetrafluoropropylene, triflouroethane pentafluoropropylene, tetrafluoroethane, pentafluoroethane, tetrafluoromethane, hexafluoroethane, trichlorofluoromethane (Freon 11), dichlorodifluoromethane (Freon 12), dichlorotetrafluoromethane (Freon 114) and the like. Mixtures of halogenated hydrocarbon and hydrocarbon may also be used, e.g., Freon 12 and isobutane as well as compressed gases.

The composition, provided as described, may be applied to a variety of hard surfaces to give continuous glossy and spot-free surface. Surfaces to be treated include finished wood having a stained lacquered finish such as furniture and wood panelling, unlacquered wood, metal, painted, lacquered metal and the like, e.g., automobiles, metal furniture or outdoors or indoors use etc. In preparing polishes for metal surfaces it is recommended to include from about 0.2 to 2.0 percent weight of amine functional silicone which increases resistance of the applied coating to detergents. Surfaces likely to be exposed to a variety of weather conditions, e.g., automobiles, outdoor furniture and the like are effectively protected by the compositions described herein, which display excellent resistance to dust collection, water, sun rays and the like. When the composition is provided in non-aerosol form, it may be applied to the surface using a soft cloth such as flannel cloth or other applicator and then wiped to form an effective protective coating with a minimum effort.

The final emulsion comprises a continuous solvent phase containing the wax, silicone, oil etc. i.e., all oil soluble or dispersible ingredients, and a discontinuous water phase containing all water soluble or dispersible ingredients such as surfactant. Ingredients of an optional nature are added to the phase portion in which they are soluble or dispersible. If volatility presents no problems, such ingredients may be added to the corresponding separate phase prior to emulsification, i.e., adding the aqueous phase to the solvent phase. However, in some instances, as is the case with the perfume component, it is not feasible to include same until cooling of the final emulsion product has been completed. This is to insure minimal loss of perfume, which is often costly, through volatilization.

The following examples are given for purposes of illustration only and are not to be interpreted as necessarily limiting the invention. All percentages are by weight unless otherwise indicated.

EXAMPLE 1

A furniture polish of the following composition:

| | |
|---|---:|
| Solvent: Isopar C (Isoparaffinic hydrocarbon - Exxon Corp.) | 27.613 |
| Emulsifier Arlacel 83 (Sorbitan sesquioleate - ICI American) 1500 cps | .500 |
| White Light Mineral Oil | .460 |
| G.E. Silicone SF-96 (500 cs) (Dimethylpolysiloxane) | .921 |
| G.E. Silicone SF-96 (1000 cs) (Dimethylpolysiloxane) | .921 |
| Hoechst Wax E (Montan ester wax - American Hoechst Co.) | .460 |
| No. 1 Carnauba Wax | .345 |
| Water | 68.280 |
| Perfume | .500 |
| | 100.000 | is prepared by adding the isoparaffinic hydrocarbon solvent to a jacketed, stainless steel heating vessel equipped with a high shear stirrer blade. The solvent is stirred rapidly (550 rpm) while the wax components, emulsifier, mineral oil and silicone are added. The mixture is heated to a temperature of from 170°F and is maintained until all ingredients are dissolved or melted whereby to achieve a uniform state of dispersion. At this point, the heat source is removed. Water at a temperature of about 55°F is added slowly to the solvent composition while maintaining vigorous agitation. Emulsion formation commences substantially immediately upon the introduction of water. Upon completion of water addition, the temperature of the resultant emulsion is about 70°F. Perfume is then added to the completely cooled composition. The average particle size of the product emulsion which is an easily pourable liquid is from 2 to 5 microns.

A portion of the composition is incorporated in an aerosol container, the composition constituting about 85 percent by weight of the contents of the container, the remaining 15 percent consisting of liquefied propellant such as described in the foregoing discussion. The material is sprayed of four wood specimens having different surfaces; (1) varnished, (2) lacquered, (3) painted, and (4) uncoated. In each instance, the composition is spread easily uniformly, dries quickly and is easily buffed with a flannel cloth to provide a smear-free, non-flammable, high gloss, hard, durable water-repellant finish highly resistant to lint and dust collection, and environmental effects such as heat and moisture. The applied coating has a pleasant, non-greasy "feel," smooth to the touch. When compared with known compositions, not only are the aforementioned properties improved, but moreover, are retained for a longer period of time. The apparent depth of the finish is enhanced while the grainy character of the wood specimen is high-lighted to an exceptional extent.

The aforedescribed improvements are even more evident when the wood surface to be treated is cleaned with soap and water or wiped with solvent prior to applying the composition.

EXAMPLE 2

Example 1 is repeated except that the solvent composition is allowed to cool to room temperature and stored for several hours prior to the addition of water having a temperature of 65°F. The solvent composition is at room temperature when water is added. The average particle size of the composition is from about 2 to 5 microns. Aerosol wood-surface treating compositions is prepared as in Example 1 provide similarly improved results when applied to a variety of wood specimens.

EXAMPLE 3

A composition of the following ingredients is prepared using ice in place of water and otherwise following the procedure of Example 1.

|  | Wt. % |
| --- | --- |
| Isopar C | 48.00 |
| Hoechst Wax E | 0.75 |
| Carnauba Wax | 0.75 |
| Silicone SF-96 (500 cs) | 1.60 |
| Silicone SF-96 (1000 cs) | 1.20 |
| Arlacel 83 | 1.75 |
| Ice | 45.95 |

The results are excellent in both aerosol and non-aerosol form.

EXAMPLE 4

A composition of the following is prepared following procedure of Example 1.

|  | Wt. % |
| --- | --- |
| Isopar C | 27.60 |
| Hoechst Wax E | 0.55 |
| Carnauba Wax | 0.42 |
| Silicone SF-96 (500 cs) | 1.40 |
| Silicone SF-96 (1000 cs) | 1.40 |
| Arlacel 83 | 1.75 |
| Water | 66.78 |

After the emulsion is formed and cooled to room temperature 0.10% of formalin (37% aqueous formaldehyde) is added.

EXAMPLE 5

Following the procedure of Example 1 the following is formulated:

|  | Wt. % |
| --- | --- |
| Isopar C | 27.60 |
| Hoechst Wax E | 1.40 |
| Carnauba Wax | 1.40 |
| Arlacel 83 | 1.75 |
| Silicone (10,000 cs) | 2.00 |
| Silicone (100 cs) | 1.00 |
| Perfume | 0.50 |
| Preservative (Germall 115)* | 0.05 |
| Deionized Water | 64.45 |

*1,1-methylene bis [3-(3 [hydroxymethyl] 2,4 dioxo-5-imidazolidinyl)] urea (Sulton Laboratories)

An excellent polish is produced.

EXAMPLE 6

The following is formulated and tested according to the procedure of Example 1.

|  | Wt. % |
| --- | --- |
| Isopar E* | 6.83 |
| Isopar C | 20.47 |
| Carnauba Wax | 0.69 |
| Hoechst Wax E | 0.46 |
| Mineral Oil | 0.46 |
| Arlacel 83 | 0.30 |
| Silicone (350 cs) | 0.92 |
| Silicone (1000 cs) | 0.92 |
| Water | 68.98 |

This formulation is quite satisfactory, but requires longer rub out time than previous formulations.

EXAMPLE 7

The following is prepared following the general procedure of Example 1 except that all of the Silicones are added after the water is added and emulsion is formed:

|  | Wt. % |
| --- | --- |
| Isopar C | 40.00 |
| Hoechst Wax F | 2.00 |
| Hoechst Wax Kss (a partially saponified montan ester wax) |  |
| Arlacel C (sorbitan sesquioleate 1000 cps) | 1.50 |
| Water | 51.50 |
| Silicone (100 cs) | 2.53 |
| Silicone (10,000 cs) | 0.47 |

An excellent product results.

EXAMPLE 8

A composition is formulated and tested according to the procedure of Example 1 containing

|  | Wt. % |
|---|---|
| Isopar C | 30.00 |
| Hoechst Wax E | 2.00 |
| Carnauba Wax | 2.00 |
| Stearic Acid | 3.00 |
| Triethanolamine | 2.00 |
| Silicone (10,000 cs) | 2.00 |
| Silicone (100 cs) | 1.00 |
| Perfume | 0.50 |
| Preservative | 0.10 |
| Deionized Water | 57.40 |

A fine product is produced.

EXAMPLE 9

A cream-like composition is prepared using the procedure of Example 1.

|  | Wt. % |
|---|---|
| Isopar C | 24.00 |
| Hoechst Wax E | 1.00 |
| Carnauba Wax | 1.00 |
| Arlacel 83 | 2.00 |
| Silicone (350 cs) | 1.00 |
| Silicone (2000 cs) | 2.00 |
| Water | 69.00 |

An outstanding product results.

EXAMPLE 10

The following composition is prepared following the procedure of Example 1.

|  | Wt. % |
|---|---|
| Isopar C | 29.40 |
| Hoechst Wax E | 0.59 |
| Carnauba Wax | 0.58 |
| Arlacel 83 | 1.75 |
| Silicone (500 cs) | .59 |
| Silicone (1000 cs) | .39 |
| Dow Corning XF-13-595 Silicone* | 1.82 |
| Water | 64.88 |

*amine functional dimethyl polysiloxane

An excellent product results.

EXAMPLE 11

Example 10 is repeated except that the total wax is 1.00 percent Carnauba and the water is raised proportionately.

EXAMPLE 12

Example 1 is repeated except that only one-half of the total silicone mixture is added before the water and the remaining one-half is added after the emulsion is formed.

What is claimed is:

1. A process for the preparation of a stable water in oil emulsion useful for treating hard surfaces which comprises adding to, whereby intimately contact, an organic solvent composition comprising:
    A. from about 0 to 9 percent of organopolysiloxane having a viscosity at 25°C of from about 20 to 15,000 cs,
    B. from about 15 to 35 percent of organic solvent having an aniline point of from about −22° to 185°F and a distillation range of from about 190° to 460°F, said solvent being substantially miscible with said organopolysiloxane,
    C. an effective amount of a water in oil emulsifier,
    D. from about 0.1 to 3 percent of wax, said wax having been added to said solvent (B) in solid, non-molten form each of (A), (C) and (D) being uniformly dispersed through solvent (B),
   from about 50 to 84 percent of water in the liquid or frozen state, said liquid water having a temperature no higher than about 105°F, and thereafter adding from about 0 to 9 percent of organopolysiloxane having a viscosity at 25°C of from about 20 to 15,000 cs, so that the total amount of said polysiloxane present in the composition ranges from about 0.05 to 9 percent.

2. A process according to claim 1 wherein said solvent (B), organopolysiloxane (A), emulsifier (C) and wax (D) are heated to a temperature of from about 160° to 180°F, said solvent (B) being agitated throughout the addition of (A), (C) and (D).

3. A process according to claim 2 wherein mineral oil is added prior to the addition of wax (D).

4. A process according to claim 1 wherein said intimate contacting is achieved agitating said solvent composition during the addition of said liquid of frozen water thereto.

5. A process accordong to claim 1 wherein said emulsifier (C) is sorbitan sesquioleate.

6. A process according to claim 1 wherein the concentration of emulsifier is from about 0.25 to 3 percent.

7. A process according to claim 1 wherein wax (D) comprises from about 0.05 to 1.5 percent of carnauba wax and from about 0.05 to 1.5 percent of montan ester wax.

8. A process according to claim 1 wherein the temperature of the solvent composition just prior to the addition of water is from about 70° to 180°F.

9. A process according to claim 1 wherein an effective amount of perfume is added upon complete cooling of the emulsion.

10. A process according to claim 1 wherein an effective amount of perservative is added upon complete cooling of the emulsion.

11. A process according to claim 1 wherein said organopolysiloxane is polydimethylsiloxane.

12. A process according to claim 1 wherein all of the organopolysiloxane is added after the water addition.

13. A process according to claim 1 wherein part of the organopolysiloxane is added prior and the remainder after the water addition.

14. A water in oil emulsion useful for treating hard surfaces having a continuous organic solvent phase and a discontinuous water phase comprising:
    A. a mixture of (1) organopolysiloxane having a viscosity at 25°C of from about 50 to 550 cs, and (2) organopolysiloxane having a viscosity at 25°C of from about 950 to 15,000 cs, and wherein (1) and (2) comprising from 0.5 to 9 percent of the total emulsion,
    B. from about 15 to 35 percent of organic solvent having an aniline point of from about −22° to 185°F and a distillation range of from about 190°F to 460°F, said solvent being substantially miscible with said organopolysiloxane, wherein at least about 50 percent of said solvent comprises isoparaffinic hydrocarbon solvent having an initial boiling point of 190°–210°F,
C. an effective amount of water in oil emulsifier,
d. from about 0.1 to 3 percent of wax,
E. the balance water.

15. A composition according to claim 14 additionally containing an effective amount of perfume.

16. A composition according to claim 14 additionally containing an effective amount of preservative.

17. A composition according to claim 14 wherein said organopolysiloxane is dimethylpolysiloxane.

18. A composition according to claim 14 wherein said emulsifier is sorbitan sesquioleate.

19. A composition according to claim 14 wherein said wax is from about 0.05 to 1.5 percent carnauba wax and from about 0.05 to 1.5 percent of montan ester wax.

20. The composition of claim 14 in the form of a self spraying composition in an aerosol container, said composition comprising from about 50 to 95 percent of the container contents, the remainder being propellant.

21. A composition obtained in accordance with the process of claim 1.

22. A composition obtained in accordance with the process of claim 2.

* * * * *